United States Patent [19]

von der Haegen et al.

[11] Patent Number: 5,408,280
[45] Date of Patent: Apr. 18, 1995

[54] PROCESS FOR RENDERING CONTACT LENSES HYDROPHILIC

[75] Inventors: Harro M. von der Haegen, Laufach; Horst Schäfer, Aschaffenburg; Bernhard Seiferling, Goldbach; Rolf Siegel, Würzburg, all of Germany

[73] Assignee: Ciba-Geigy Corporation, Ardsley, N.Y.

[21] Appl. No.: 805,733

[22] Filed: Dec. 9, 1991

[30] Foreign Application Priority Data

Dec. 19, 1990 [CH] Switzerland ............... 4031/90

[51] Int. Cl.⁶ ............... G02C 7/04; B05D 5/06
[52] U.S. Cl. ............... 351/160 H; 427/212; 427/164; 427/384
[58] Field of Search ............... 427/164, 2, 384, 2.12; 351/160 H

[56] References Cited

U.S. PATENT DOCUMENTS

| | | | |
|---|---|---|---|
| 4,199,421 | 4/1980 | Kamada et al. | 427/164 |
| 4,311,732 | 1/1982 | Kgetsu et al. | 427/164 |
| 4,332,857 | 6/1982 | Taniyama et al. | 427/164 |
| 4,424,328 | 1/1984 | Ellis | 526/279 |
| 4,463,149 | 7/1984 | Ellis | 526/279 |
| 4,625,007 | 11/1986 | Ellis | 526/279 |
| 4,668,240 | 5/1987 | Loshaek | 427/2 |
| 4,686,267 | 8/1987 | Ellis | 526/245 |
| 4,814,207 | 3/1989 | Siol et al. | 427/164 |
| 4,876,126 | 10/1989 | Takemura et al. | 427/2 |
| 5,128,170 | 7/1992 | Matsuda et al. | 427/2 |

FOREIGN PATENT DOCUMENTS

| | | |
|---|---|---|
| 073649 | 3/1983 | European Pat. Off. . |
| 219196 | 4/1987 | European Pat. Off. . |
| 276631 | 8/1988 | European Pat. Off. . |
| 3919370 | 12/1990 | Germany . |
| 9106020 | 5/1991 | WIPO . |

OTHER PUBLICATIONS

Database Abstract AN 82-70092E, Derwent, to Drake, N.J.

Primary Examiner—Janyce Bell
Attorney, Agent, or Firm—Edward McC. Roberts; R. Scott Meece

[57] ABSTRACT

The invention relates to a process for rendering contact lenses hydrophilic, which comprises treating a contact lens with a compound of formula I $$\text{Ar—Z—Ar'} \qquad (I)$$

wherein Ar and Ar' are each independently of the other an aromatic radical that may be substituted by lower alkoxy and/or by lower alkyl and wherein one of the radicals Ar and Ar' or both radicals Ar and Ar' contain one or more substituents X selected independently of one another from a polar functional group Y, lower alkyl substituted by a polar functional group Y, and lower alkoxy substituted by a polar functional group Y, and wherein Z is a divalent group that separates Ar and Ar' from each other by from one to six atoms. The invention relates also to contact lenses treated according to the invention and to the use of compounds of formula I in the process according to the invention.

16 Claims, No Drawings

PROCESS FOR RENDERING CONTACT LENSES HYDROPHILIC

The invention relates to a process for rendering contact lenses hydrophilic, to contact lenses that have been treated according to that process, and to the use of particular compounds in that process for rendering contact lenses hydrophilic.

Rendering contact lenses hydrophilic consists essentially in rendering the surface of contact lenses hydrophilic. Increased hydrophilicity of the contact lens surface improves the wettability of the contact lenses. This in turn improves the wear comfort of contact lenses. The physicochemical prerequisite for the hydrophilicity of a contact lens surface is the presence of polar functional groups, for example hydroxy, amino, carboxy or the like.

Hitherto, contact lens surfaces have generally been rendered hydrophilic by plasma activation. However, this requires a relatively high outlay in terms of apparatus, and the process is cost-intensive. In addition, the permanence of this kind of surface activation is not always satisfactory.

There is therefore a need to improve the known processes of the prior art so that, by simpler means, the surface of contact lenses can be provided in as permanent a manner as possible with functional groups that render the surface of the contact lenses hydrophilic. According to the invention, this problem is solved by the provision of a process in which contact lenses are treated with special compounds that comprise aromatic (non-polar) parts and functional (polar) groups. In contrast to the plasma treatment according to the prior art, the process according to the invention can be carried out in a liquid phase under conditions which do not require any outlay in terms of apparatus.

The invention therefore relates to a process for rendering contact lenses hydrophilic, which comprises treating a contact lens with a compound of formula I

Ar—Z—Ar'  (I)

wherein Ar and Ar' are each independently of the other an aromatic radical that may be substituted by lower alkoxy and/or by lower alkyl and wherein one of the radicals Ar and Ar' or both radicals Ar and Ar' contain one or more substituents X selected independently of one another from a polar functional group Y, lower alkyl substituted by a polar functional group Y, and lower alkoxy substituted by a polar functional group Y, and wherein Z is a divalent group that separates Ar and Ar' from each other by from one to six atoms.

An aromatic radical Ar or Ar' is a carbocyclic or heterocyclic radical, especially a monocyclic or bicyclic aromatic radical having, respectively, 5 or 6 ring atoms and a total of up to 12 ring atoms. A carbocyclic aromatic radical Ar or Ar' is phenyl or naphthyl, preferably phenyl. A heterocyclic aromatic radical Ar or Ar' preferably contains from one to three hetero atoms and is preferably monocyclic. Examples are the monovalent radicals of pyridine, pyrimidine, pyrazine, furan, thiophene, pyrrole or thiazole.

Radicals and compounds characterised by the term "lower" are radicals and compounds that have up to 7 carbon atoms, preferably up to 4 carbon atoms.

Lower alkyl is alkyl having up to 7 carbon atoms and is, for example, methyl, ethyl, propyl, butyl, tert-butyl and hexyl.

Lower alkoxy is alkoxy having up to 7 carbon atoms and is, for example, methoxy, ethoxy, propoxy, butoxy, tert-butoxy and hexyloxy.

Of the substituents X, the groups Y are preferred. Within the context of the present disclosure, polar functional groups Y are to be understood as being monovalent groups that contain at least one hetero atom and the presence of which brings about hydrophilicity. These include, for example, groups that may be described as reactive, hydrolysable, hydratable, capable of forming hydrogen bridges, ionogenic, i.e. protonisable or deprotonisable, or charged, i.e. cationic or anionic. Especially suitable are groups such as hydroxy (—OH), mercapto (—SH), amino (—NH$_2$), formyl (—CHO), carboxy (—COOH), carbamoyl (—CONH$_2$), lower alkoxycarbonyl (—COOR, wherein R is lower alkyl), carboxylato (—COO$^-$), sulfonato (—SO$_3^-$), the sulfuric acid ester group (—SO$_4^-$), sulfato (—SO$_4^{2-}$), phosphato (—PO$_4^{3-}$) or ammonio (—NH$_3^+$). Preference is given to sulfonato and carboxy, especially to the carboxy group.

Lower alkyl substituted by such a group Y is especially methyl, ethyl, propyl or butyl that contains one of the above-mentioned polar functional groups, for example hydroxymethyl, aminobutyl, formylethyl, carbamoylethyl, carboxymethyl or ammoniopropyl. Lower alkoxy substituted by such a group Y is especially methoxy, ethoxy, propoxy or butoxy that contains one of the above-mentioned polar functional groups, especially in the 2-position, or in a higher position when the group Y is bonded via a hetero atom. Examples are 2-hydroxyethoxy, 4-aminobutoxy, formylethoxy, carbamoylmethoxy, carboxymethoxy or 3-ammoniopropoxy.

The divalent group Z that separates Ar and Ar' from each other by from one to six atoms is polar or non-polar and preferably contains up to 10 atoms. This group Z acts as a bridge between Ar and Ar'. The divalent group Z separates Ar and Ar' from each other especially by one atom. Examples are pure hydrocarbon bridges Z, such as methylene (—CH$_2$—), 1,1-ethylene (—CH(CH$_3$)—) or 2,2-propylene (—C(CH$_3$)$_2$—), also hetero bridges Z, such as oxygen (—O—), sulfur (—S—), sulfenyl (—SO—), sulfonyl (—SO$_2$—), amino (—NH—) or ammonio (—NH$_2^+$—), or mixed forms, such as carbonyl (—CO—) or methylamino (—N(CH$_3$)—). Further examples are 1,2-ethenylene (—CH═CH—) and 1,6-phenylene. Especially preferred as the group Z is the carbonyl group.

Depending on the meaning of the group Z, the compounds of formula I are, for example, diarylmethane, diarylethane or diarylpropane compounds, diaryl ethers, diaryl sulfides, diaryl sulfoxides, diarylsulfones, diarylamines, diarylammonium compounds or diaryl ketones, in which the two aromatic radicals Ar and Ar' belong either to the same kind of ring system or to different kinds of ring systems, which radicals Ar and Ar', of course, may be substituted by lower alkyl and/or by lower alkoxy and which contain one or more substituents X.

Preference is given to the compounds of formula I wherein Ar and Ar' belong to the same kind of aromatic ring system, which radicals Ar and Ar', of course, may be substituted by lower alkyl and/or by lower alkoxy and which contain one or more substituents X. Preference is given also to compounds of formula I wherein both Ar and Ar' are phenyl, which radicals Ar and Ar', of course, may be substituted by lower alkyl and/or by lower alkoxy and which contain one or more substituents X. Examples are diphenylmethane, diphenylethane or diphenylpropane compounds, diphenyl ethers, diphenyl sulfides, diphenyl sulfoxides, diphenylsulfones, diphenylamines, diphenylammonium compounds and diphenyl ketones, which compounds, of course, may be substituted by lower alkyl and/or by lower alkoxy and which contain one or more substituents X.

In a special form there are used compounds of formula I wherein Ar and Ar' belong to the same kind of aromatic ring system and are substituted independently of each other by lower alkyl and/or by lower alkoxy. Examples are 3-phenoxytoluene and 3-methyl-4'-methoxydiphenylsulfone, which compounds, of course, also contain one or more groups X.

In a further special form there are used compounds of formula I wherein Ar and Ar' belong to the same kind of aromatic ring system and either are not substituted by lower alkyl or lower alkoxy or are substituted symmetrically by identical groups lower alkyl or lower alkoxy. Examples are diphenylmethane, 2,2-diphenylpropane, diphenyl ether, diphenyl sulfide, diphenyl sulfoxide, diphenylsulfone, diphenylamine, diphenylmethylamine, diphenyl ketone, or 3,3'-diethoxydiphenylsulfone or 4,4'-dimethyldiphenylmethane, which compounds, of course, also contain one or more groups X.

Suitable compounds of formula I are, for example, those wherein the substituent X is lower alkyl substituted by Y. These include inter alia 3-phenoxybenzyl alcohol, 3-benzoylbenzyl alcohol or 4-aminobutyldiphenyl sulfide.

In the process according to the invention, special preference is given to compounds of formula I wherein at least one substituent X is a group Y, that is to say compounds of formula I wherein the polar functional group Y is bonded directly to a ring atom of Ar or Ar'. These compounds include inter alia 3-phenoxybenzaldehyde, 4,4'-diaminodiphenylmethane, 4,4'-diaminodiphenylsulfone, 4,4'-diaminodiphenylammonium sulfate, 3,4-diaminobenzophenone, 4,4'-diaminodiphenyl ether, 2,4-dihydroxybenzophenone, 2,2-bis-(4-hydroxyphenyl)propane, 2-benzoylbenzoic acid, benzophenone-3,3',4,4'-tetracarboxylic acid, diphenylamine-4-sulfonic acid salts, such as the corresponding barium or calcium salt, diphenylamine-2-carboxylic acid, 3,3',4,4'-tetrahydroxydiphenyl sulfide, 4,4'-dihydroxydiphenylsulfone, sulfonated 3-phenoxybenzyl alcohol, or sulfated or phosphated 2,2-bis-( 4-hydroxyphenyl)propane.

Sulfonated, sulfated or phosphated compounds as mentioned in the preceding paragraph are to be understood as being compounds which can be prepared from the base compounds in accordance with standard methods, for example according to Organikum, 9th edition, VEB Deutscher Verlag der Wissenschaften, Berlin 1970, page 336 ff. These processes are in many cases sufficient to produce from compounds of formula I wherein a group Y is lacking, compounds of formula I in which suitable groups Y are present. Furthermore, in this manner it is also possible to introduce additional groups Y into compounds of formula I, i.e. compounds that already contain a group Y, for example hydroxy.

The compounds of formula I are known or can be prepared in a manner known per se, for example as mentioned in the preceding paragraph. Some classes of compounds of formula I can be prepared in situ during the process according to the invention from precursors which are in some cases more stable to storage or are especially readily obtainable. The precursors hydrolyse in the aqueous phase to form compounds of formula I.

This applies, for example, to compounds of formula I wherein Ar and/or Ar' has/have vicinally two groups Y that are carboxy. In such a case, the obvious course of action is to use the corresponding carboxylic acid anhydride. Thus, the compound that is expediently used when a contact lens is to be treated with benzophenone-3,3',4,4'-tetracarboxylic acid is benzophenone-3,3',4,4'-tetracarboxylic acid dianhydride. This also applies, for example, to compounds of formula I that contain groups Y wherein Y is sulfonato. In such a case it is possible to use the corresponding sulfo chloride. Thus, the compound that can be used when a contact lens is to be treated with sulfonated 3-phenoxybenzyl alcohol is, for example, sulfochlorinated 3-phenoxybenzyl alcohol that contains chlorosulfonyl groups (—$SO_2Cl$). Chlorosulfonated aromatic compounds that are required for this purpose can likewise be prepared, for example, according to Organikum.

The process according to the invention is carded out by treating a contact lens with a compound of formula I in a liquid phase. When choosing the liquid phase, the surface tension of the liquid is matched to that of the contact lens. The liquid phase generally comprises the compound of formula I which is dissolved or suspended in an aqueous medium. Instead of water there may be used, for example, solvents such as certain lower alkanols, especially methanol, or low molecular weight ketones, especially acetone, and also mixtures thereof with water may be used. Acids or bases may also be added.

The treatment step is expediently carded out in such a manner that the contact lens is introduced into the liquid phase. In connection with this disclosure, however, the term treatment will also be understood as meaning any other form of sufficiently intensive contacting. The term covers, for example, measures such as impregnating, spraying, coating, mixing or immersing.

The reaction conditions are not critical within wide limits. In principle, elevated temperatures reduce the required treatment time, while the treatment times increase at lower temperatures. Suitable temperatures are within a range of from approximately 10° C. to the boiling temperature of the liquid phase that is used, especially from approximately room temperature to approximately 80° C., with a range of from approximately 40° C. to approximately 70° C. being preferred. The duration of treatment is from a few minutes to approximately one day, especially from approximately 20 minutes to approximately 12 hours. Preferred combinations are, for example, treatment at room temperature for 12 hours or at 70° C. for 20 minutes. Of course, the optimum conditions in an individual case are dependent on the specific components used and can easily be adapted by the person skilled in the art.

The treatment according to the invention is concluded by removing the contact lens from the liquid phase. This step is expediently followed by a rinsing step. Suitable rinsing agents are inert solvents which do not damage the contact lens but nevertheless remove residues of the compound of formula I from the lens. Examples of suitable solvents for that purpose are glycerol, ethanolamine, polyvinyl alcohol or, especially, water, and also isotonic saline solution. The modified lens is then stored in a suitable manner or used for its intended purpose.

Contact lenses that are expediently treated according to the process of the invention are contact lenses having a hydrophobic or insufficiently hydrophilic surface. These contact lenses are generally poorly swellable in water. Without treatment according to the invention they normally comprise after complete swelling in water less than 10% by weight of water, generally approximately up to 3% of water and frequently only up to 1.5% of water. Typical values for the water content are approximately 1% by weight of water and even less.

In connection with the present invention, a contact lens is to be understood as meaning especially, but not exclusively, a completed contact lens in which both surfaces are finished. Finished surfaces are here the basecurves or frontcurves which confer on the contact lenses the desired optical properties without additional material being removed from the lens during further treatment, for example by means of lathe-cutting processes. However, the term contact lens within the context of the present disclosure also covers precursors of contact lenses in which a portion of the surface is already finished, but another portion is not. These may be, for example, semi-mould products. It is readily possible to use the process according to the invention on the already finished surfaces of such precursors of contact lenses and then finish the rest of the surfaces.

The contact lenses that may be treated according to the invention are essentially contact lenses the copolymer of which comprises groups of the type diphenylmethane, dicyclohexylmethane, 2,2-diphenylpropane, diphenyl ether, diphenyl sulfide, diphenylsulfone and/or organosiloxane groups. Preferably, contact lenses having organosiloxane groups, for example silicone rubbers, are suitable. Organo in this connection is to be understood as meaning especially lower alkyl, especially methyl, and phenyl. Organosiloxane groups are therefore especially dimethylsiloxane groups, methylphenylsiloxane groups and diphenylsiloxane groups. Examples of such materials are described inter alia in U.S. Pat. Nos. 4,424,328; 4,463,149; 4,625,007 and 4,686,267.

The most prominent representatives of the type of contact lenses on which the process according to the invention may be used are numerous so-called RGP (rigid gas permeable) lenses, that is to say hard, gas-permeable contact lenses. They are generally composed inter alia of siloxane (meth)acrylates, and frequently comprise in addition fluorinated comonomers or also portions of typical hydrophilic comonomers (such as hydroxyethyl methacrylate, methacrylic acid or vinylpyrrolidone) or typical hydrophobic comonomers (such as methyl methacrylate).

Examples of contact lenses that comprise diphenylmethane groups are those which comprise corresponding polyurethanes, for example polyurethanes derived from 4,4'-diaminodiphenylmethane and an isocyanate or from diphenylmethane 4,4'-diisocyanate and an amine, or polyimides. Contact lenses that comprise dicyclohexylmethane groups may also contain those groups as polyurethanes, for example as polyurethanes derived from dicyclohexylmethane 4,4'-diisocyanate and an amine or from 4,4'-diaminodicyclohexylmethane and an isocyanate; or as polyamides. Examples of contact lenses that comprise 2,2-diphenylpropane groups are found among representatives from certain polycarbonates, polysulfones and epoxy resins. Examples of contact lenses that comprise diphenyl ether groups are found among representatives from certain polyethers, poly(ether)sulfones and polyether ketones. The above-mentioned copolymer constituents are, naturally, suitable for contact lenses only if the polymers obtainable therefrom satisfy the known optical requirements for contact lenses.

The invention relates also to contact lenses treated in accordance with the invention. The invention also includes the use of the compounds of formula I in the above-described process.

The following Examples serve solely to illustrate the subject of the invention. They are, however, not intended to limit the subject of the invention in any way, for example to the subject of the Examples.

EXAMPLE 1

The material on which the PERSECON CE contact lens of CIBA Vision GmbH, Aschaffenburg, is based is used. In order to simplify the test conditions, there is used instead of a completed contact lens a copolymer that is in the form of a small disk but otherwise is identical with the contact lens. This contact lens comprises a copolymer based on silicone with methyl methacrylate. The small disk is brought into contact with a saturated solution of benzophenone-3,3',4,4'-tetracarboxylic acid dianhydride in water/methanol (1:2 v/v) for 12 hours at room temperature. The disk is then removed from the solution and washed with deionised water.

EXAMPLE 2

Material treated according to Example 1 can be dyed with the cationic dye Pyronin G. This is not possible with PERSECON CE that has not been treated according to the invention (control).

EXAMPLE 3

Material treated according to Example 1 has a hydrophilic surface. This is verified by the change in the contact angle. The contact angle before treatment according to the invention is approximately 60°, after treatment according to the invention it is approximately from 20° to 30° (bubble method).

EXAMPLE 4

The hydrophilic surface of the material treated according to Example 1 is also resistant to abrasion. The abrasion resistance is studied as follows. The treated disk is fastened to the base of a container. A polishing cloth is placed on top with a bearing weight of 370 g. The disk and the polishing cloth are covered with Boston Cleaner ®, an abrasive cleaner for contact lenses. The container holding the disk is rotated for five minutes (505 revolutions/minute) and at the same time the polishing cloth is moved to and fro mechanically (32 strokes/minute). The contact angle is then determined again. After the described treatment, the contact angle is largely unchanged, that is to say the increased hydrophilicity brought about according to the invention has not been reduced again by the rough test conditions, or at least not appreciably.

EXAMPLE 5

The process according to the invention also proves superior in comparison with the prior art: PERSECON CE lenses having a contact angle of 61° (untreated) are subjected to plasma treatment, after which they have a contact angle of 43° (treated in accordance with the prior art). Use of the cleaning procedure described in Example 4 brings about an increase in the contact angle to 66°.

In contrast, treatment of PERSECON CE lenses in accordance with the invention, likewise starting with a contact angle of 61° (untreated), leads to a contact angle of 24° (treated in accordance with this invention). Use of the cleaning procedure described in Example 4 brings about only a slight increase in the contact angle, namely to 36°.

What is claimed is:

1. A process for rendering contact lenses hydrophilic, which comprises treating a contact lens or precursor thereof with a compound of the formula I

wherein Ar and Ar' are aromatic radicals each independently of the other selected from the group consisting of phenyl, naphthyl, and the monovalent radicals of pyridine, pyrimidine, pyrazine, furan, thiophene, pyrrole, and thiozole, wherein at least one of the radicals Ar or Ar' contain one or more substituents X selected independently of one another from a polar functional group Y, a lower alkyl substituted by a polar functional group Y, and a lower alkoxy substituted by a polar funtional group Y, wherein Y is selected from the group consisting of hydroxyl (—OH), mercapto (—SH), amino (—$NH_2$), formyl (—CHO), carboxy (—COOH), carbamoyl (—$CONH_2$), lower alkoxycarbonyl (—COOR, wherein R is lower alkyl), carboxylato (—$COO^-$), sulfanato (—$SO_3^-$), the sulfuric acid ester group (—$SO_4^-$), sulfato (—$SO_4^{2-}$), phosphato (—$PO_4^{3-}$), and ammonio (—$NH_3^+$), and wherein Z is a divalent group selected from the group consisting of methylene (—$CH_2$—), 1,1-ethylene (—CH($CH_3$)—), 2,2-propylene (—C($CH_3$)$_2$—), oxygen (—O—), sulfur (—S—), sulfenyl (—SO—), sulfonyl (—$SO_2$—), amino (—NH—), ammonio (—$NH_2^+$—), carbonyl (—CO—), and methylamino (—N($CH_3$)—).

2. A process according to claim 1, wherein Y is selected from the group consisting of sulonato, hydroxyl, and carboxy.

3. A process according to claim 1, wherein Z is carbonyl.

4. A process according to claim 1, wherein said contact lens comprises less than 10 percent by weight water prior to treating said lens with a compound of formula I.

5. A process according to claim 1, wherein said contact lens is a hard, gas-permeable contact lens.

6. A process according to claim 1, wherein said contact lens comprises siloxane groups.

7. A process according to claim 1, wherein said contact lens precursor contains finished and unfinished surfaces.

8. A contact lens obtained by the process of claim 1.

9. A process for rendering contact lenses hydrophilic, comprising the steps of:

(a) forming a compound of the formula I

in situ from a precursor under hydroysis conditions in an aqueous phase, wherein Ar and Ar' are aromatic radicals selected, each independently of the other, from a group consisting of unsubstituted aromatic radicals, aromatic radicals substituted with lower alkoxyl groups, aromatic radicals substituted with lower alkyl groups, and aromatic radicals substituted with lower alkoxyl and alkyl groups, wherein at least one of the radicals Ar or Ar' contain one or more substituents X selected, independently of one another, from a polar functional group Y, a lower alkyl substituted by a polar functional group Y, and a lower alkoxy substituted by a polar funtional group Y, and wherein Z is a divalent group separating Ar and Ar' by one to six atoms; and (b) treating a contact lens or precursor thereof with said compound of the formula I.

10. A process according to claim 9, wherein Ar and Ar' are selected, each independently of the other, from the group consisting of phenyl, naphthyl, and the monovalent radicals of pyridine, pyrimidine, pyrazine, furan, thiophene, pyrrole, and thiozole, wherein Y is selected from the group consisting of hydroxyl (—OH), mercapto (—SH), amino (—$NH_2$), formyl (—CHO), carboxy (—COOH), carbamoyl (—$CONH_2$), lower alkoxycarbonyl (—COOR, wherein R is lower alkyl), carboxylato (—$COO^-$), sulfanato (—$SO_3^-$), the sulfuric acid ester group (-$SO_4^-$), sulfato (—$SO_4^{2-}$), phosphato (—$PO_4^{3-}$), and ammonio (—$NH_3^+$), and wherein Z is a divalent group selected from the group consisting of methylene (—$CH_2$—), 1,1-ethylene (—CH($CH_3$)—), 2,2-propylene (—C($CH_3$)$_2$—), oxygen (—O—), sulfur (—S—), sulfenyl (—SO—), sulfonyl (—$SO_2$—), amino (—NH—), ammonio (—$NH_2^+$—), carbonyl (—CO—), and methylamino (—N($CH_3$)—).

11. A process according to claim 10, wherein Y is selected from the group consisting of sulonato, hydroxyl, and carboxy.

12. A process according to claim 10, wherein Z is carbonyl.

13. A process according to claim 10, wherein said contact lens comprises, after complete swelling in water and prior to treating said lens with a compound of formula I, less than 10 percent by weight water.

14. A process according to claim 10, wherein said contact lens is a hard, gas-permeable contact lens.

15. A process according to claim 10, wherein said contact lens comprises siloxane groups.

16. A process according to claim 10, wherein said contact lens precursor contains finished and unfinished surfaces.

* * * * *